(12) United States Patent
Yaguchi

(10) Patent No.: US 11,965,565 B2
(45) Date of Patent: Apr. 23, 2024

(54) SYSTEM FOR CONTROLLING CLUTCH

(71) Applicant: GKN Automotive Limited, Birmingham (GB)

(72) Inventor: Yuu Yaguchi, Tochigi (JP)

(73) Assignee: GKN Automotive Limited, Birmingham (GB)

(*) Notice: Subject to any disclaimer, the term of this patent is extended or adjusted under 35 U.S.C. 154(b) by 0 days.

(21) Appl. No.: 18/333,616

(22) Filed: Jun. 13, 2023

(65) Prior Publication Data

US 2023/0323923 A1    Oct. 12, 2023

Related U.S. Application Data

(63) Continuation of application No. PCT/JP2020/047844, filed on Dec. 22, 2020.

(51) Int. Cl.
| | |
|---|---|
| *F16D 48/06* | (2006.01) |
| *F16D 27/06* | (2006.01) |
| *F16D 27/14* | (2006.01) |

(52) U.S. Cl.
CPC ........... *F16D 48/064* (2013.01); *F16D 27/06* (2013.01); *F16D 27/14* (2013.01); *F16D 2500/1022* (2013.01)

(58) Field of Classification Search
CPC ........ F16D 48/064; F16D 27/06; F16D 27/14; F16D 2500/1022
See application file for complete search history.

(56) References Cited

U.S. PATENT DOCUMENTS

| | | | | |
|---|---|---|---|---|
| 2,981,846 A * | 4/1961 | Maurice | ............... | F16D 48/064 |
| | | | | 192/84.1 |
| 5,481,187 A * | 1/1996 | Marcott | ............... | H01F 7/1844 |
| | | | | 324/207.16 |
| 7,876,084 B2 * | 1/2011 | Baehr | ................... | F16D 48/064 |
| | | | | 192/40 |

FOREIGN PATENT DOCUMENTS

| | | |
|---|---|---|
| JP | 2004190720 A | 7/2004 |
| JP | 2004208460 A | 7/2004 |
| JP | 2018096382 A | 6/2018 |
| WO | 2018109874 A1 | 6/2018 |
| WO | 2018118912 A1 | 6/2018 |

OTHER PUBLICATIONS

International Search Report and Written Opinion mailed Feb. 9, 2021 for PCT/JP2020/047844 (8 pages; with English translation).

\* cited by examiner

*Primary Examiner* — Huan Le

(74) *Attorney, Agent, or Firm* — Bejin Bieneman PLC

(57) ABSTRACT

A system for controlling a clutch is provided with: a thrust member movable between a first position for disconnecting the clutch and a second position for connecting the clutch; a solenoid generating a magnetic flux in response to input of electric power; a movable element drivingly coupled with the thrust member and set into motion by the magnetic flux to drive the thrust member between the first position and the second position; an electric circuit configured to add alternating-current power to the electric power and apply the electric power with the alternating-current power to the solenoid; and a controller configured to detect a phase difference of an electric current relative to an electric voltage in the alternating-current power added to the electric power and compare the detected phase difference with a reference value to determine whether the thrust member is at the first position or at the second position.

4 Claims, 8 Drawing Sheets

SYSTEM FOR CONTROLLING CLUTCH

CROSS-REFERENCE TO RELATED APPLICATIONS

This application is a continuation Application of PCT International Application No. PCT/JP2020/047844 (filed Dec. 22, 2020), the entire contents of which are incorporated herein by reference.

BACKGROUND

Rotary machines applied to vehicles often use clutches in order to selectively activate and deactivate rotary operation. A so-called lock-up differential for example has a built-in dog clutch that can be disconnected to enable differential motion between output axles and, when connected by an external actuator, locks up the differential motion.

An actuator such as a hydraulic cylinder, a cam mechanism using a motor, or a solenoid actuator, is used to operate a clutch integrated in a rotary machine from its exterior. Among solenoid actuators, some are so devised as to enable coaxial arrangement with a rotary machine and to provide a compact design that facilitates operating the rotary machine integrally with the solenoid actuator.

Even though an actuator is switched on or activated, a clutch could fail to become connected (i.e., engaged) in a rare case where clutch teeth happen to be in a positional relation that precludes or prevents mutual engagement. On the other hand, even though the actuator is deactivated, the clutch teeth could, by viscosity of lubricant or by magnetization, temporarily adhere to each other and thus fail to disconnect. In sum, switching the actuator on/off may not necessarily correspond to connection/disconnection of the clutch. In order to prevent the rotary machine from unpredictable operation, it may be desired to add a device for detecting whether the clutch is connected or not.

Such a detector requires addition of structural elements such as a pull switch onto the carrier. These elements by itself increase costs. Further, the elements on the carrier require installation work separate from that for the differential main unit, thereby complicating assembly of the vehicle. Further, in some cases, pulse currents can be applied to solenoids and responses thereto detected, whereby detectors can electrically detect states of actuators. Such devices do not require addition of structural elements but, as the pulse currents create driving force, the actuators in response can generate mechanical or acoustic noise, and, in a severe case, operation of an actuator could become unstable.

SUMMARY

The present disclosure includes a system for controlling connection and disconnection of a clutch, including a system capable of determining whether the clutch is connected or disconnected without any particular mechanism for such determination.

A system for controlling a clutch is provided with: a thrust member drivingly coupled with the clutch and movable axially between a first position for disconnecting the clutch and a second position for connecting the clutch; a solenoid generating a magnetic flux in response to input of electric power; a movable element so arranged as to receive the magnetic flux and drivingly coupled with the thrust member, the movable element being set into motion by the magnetic flux to drive the thrust member between the first position and the second position; an electric circuit configured to add alternating-current power to the electric power and apply the electric power with the alternating-current power to the solenoid; and a controller electrically connected to the electric circuit and configured to detect a phase difference of an electric current relative to an electric voltage in the alternating-current power added to the electric power, and compare the detected phase difference with a reference value to determine whether the thrust member is at the first position or at the second position.

DESCRIPTION OF EXAMPLE EMBODIMENTS

Exemplary embodiments will be described hereinafter with reference to the drawings. Throughout the following descriptions and appended claims, unless otherwise described, an axis means a central axis of an actuator, which is typically a rotation axis of a rotary body and a shaft connected to the rotary body. Drawings are not necessarily to scale and therefore it is particularly noted that dimensional relations are not limited to those drawn.

The system herein in general uses inductance change of a solenoid caused by movement of a movable element to detect positions of a thrust member coupled with the moving element and thus to detect whether the clutch is connected or disconnected. The system can be used for the purpose of controlling a clutch used in combination with any rotary machine for driving a vehicle including for connecting and disconnecting the clutch from the exterior of the rotary machine to control its operation. When the clutch is connected, torque for driving the vehicle is transmitted through the clutch, and torque is cut off when disconnected.

Figure 1:
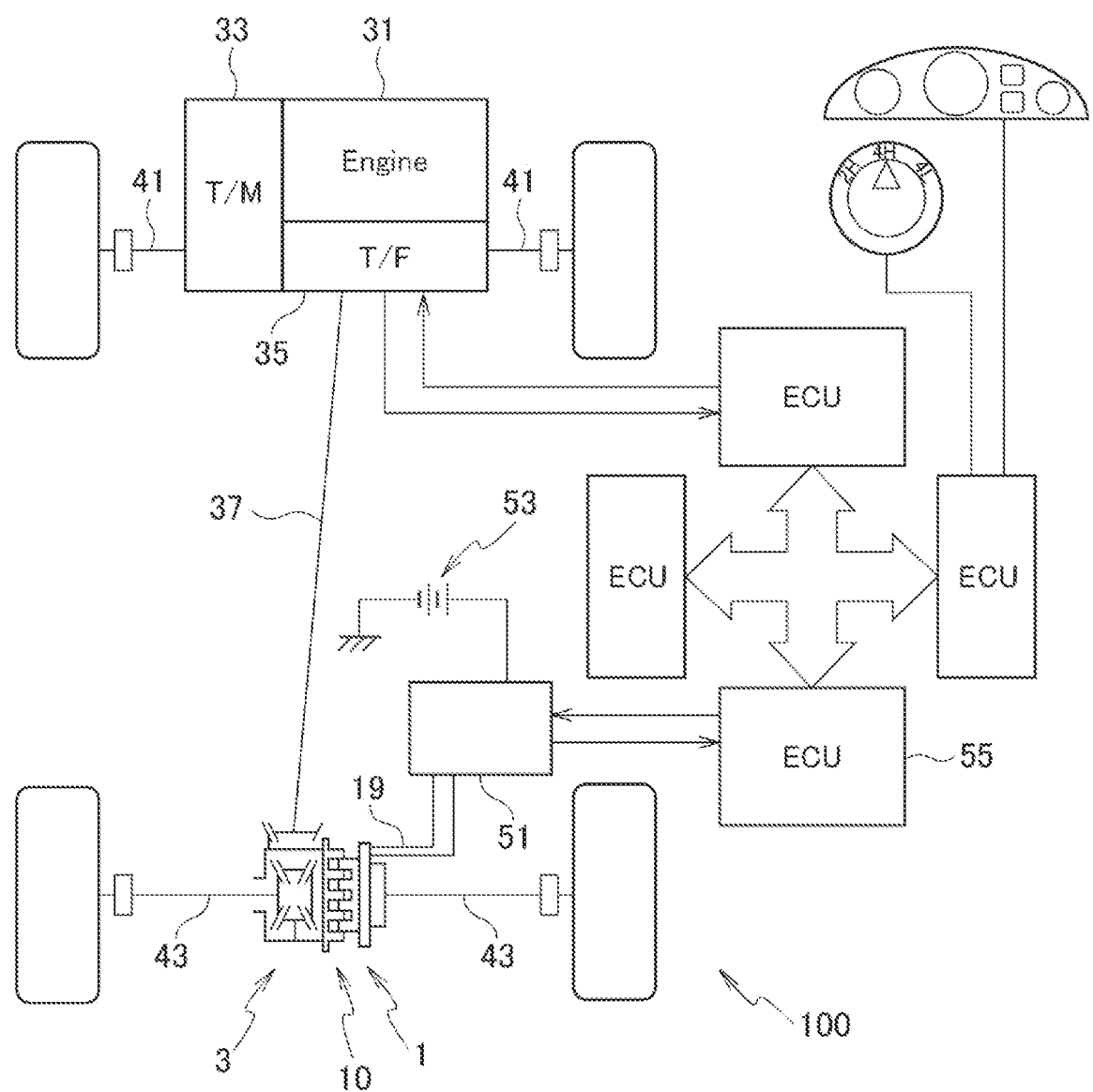
FIG. 1 is a block diagram of a vehicle including a system controlling a clutch.

Referring to FIG. 1, the vehicle is provided with an engine or a motor 31, and torque generated by the engine or the motor 31 is transmitted through a transmission 33, a transfer 35, and a propeller shaft 37, to a differential 3. The torque is thereby distributed to rear axles 43 in a case of an FR (Front Motor/Engine Rear-wheel drive) vehicle. Or, the transfer 35 may distribute the torque also to front axles 41 in a 4WD (four wheel drive) vehicle, or the torque may be distributed from the transmission 33 only to the front axles 41 in an FF (Front Motor/Engine Front Drive) vehicle); The system described herein could be applied to any of these cases. The differential 3 often has a built-in dog clutch 10 in order to control its operation, which is driven by a suitable actuator 1 at the exterior.

Figure 2:
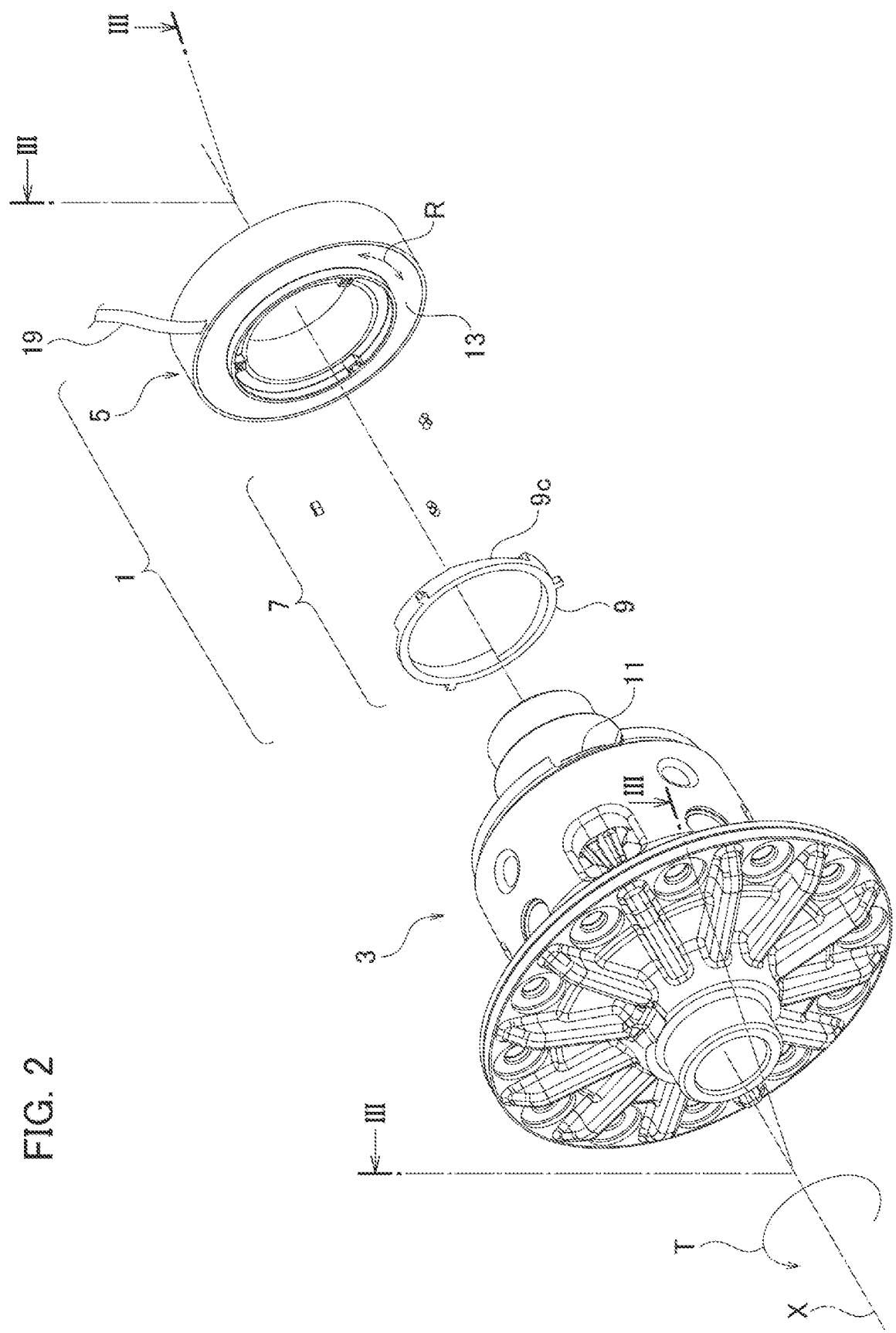
FIG. 2 is a partially exploded perspective view of a combination of the system of FIG. 1 and a lock-up differential according to an example.
Figure 3:
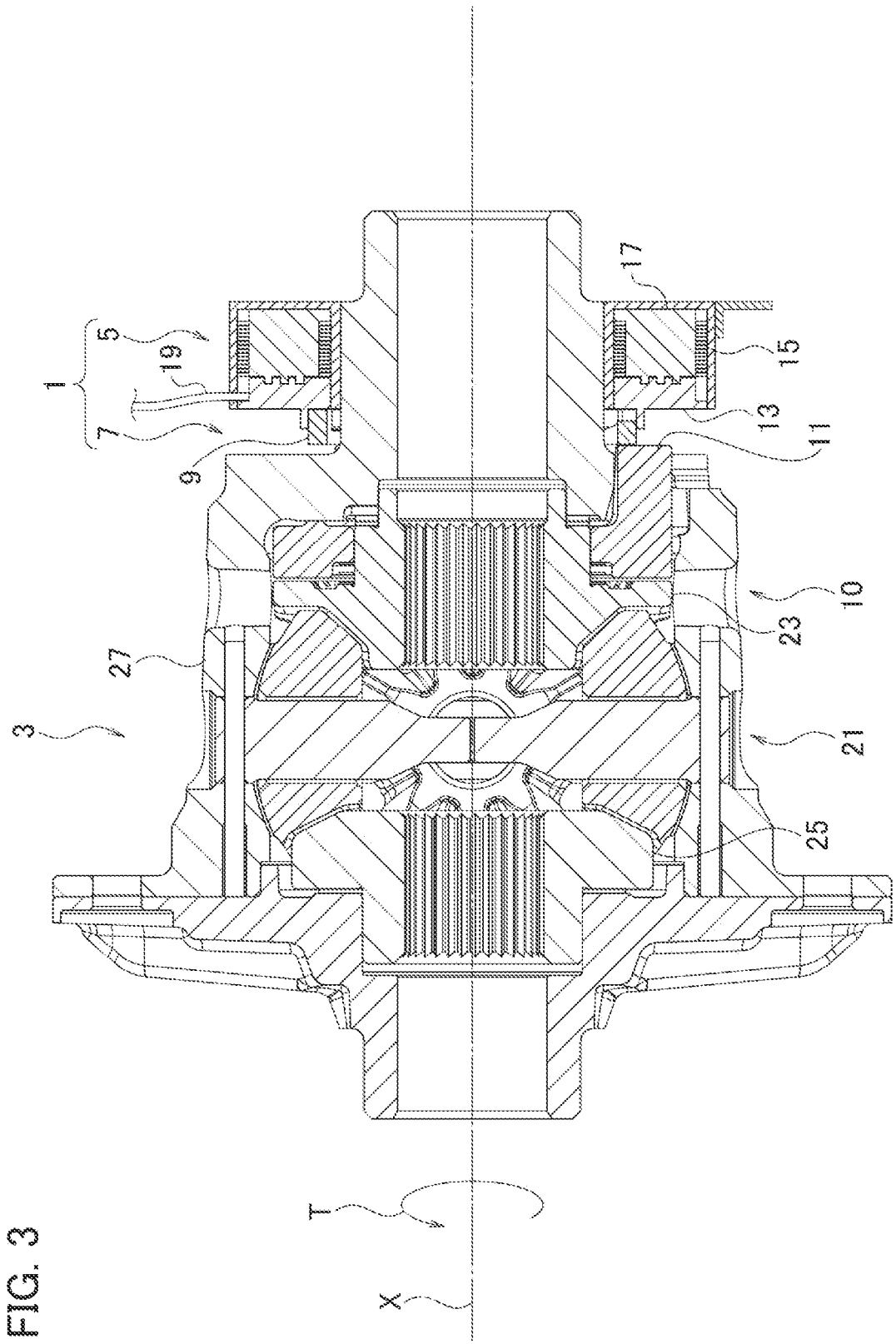
FIG. 3 is a sectional elevational view of the combination of the system of FIG. 1 and the lock-up differential, taken from the line III-III of FIG. 2.

While the system as disclosed herein is applicable to various rotary machines, one example is the differential 3 for differentially distributing torque to right and left axles. FIGS. 2, 3 and 5 for instance are examples where it is implemented with so-called lock-up differentials, and FIG. 4 is an example where it is implemented with a free-running differential.

Referring mainly to FIG. 3 in combination with FIG. 2, the differential 3 is a rotary body having a built-in clutch 10, which is capable of a rotational motion T about an axis X. The differential 3 is provided with a differential gear set 21 coupled with a case 27. The differential gear set 21 is provided with side gears 23 and 25, which are respectively coupled with rear axles 43. More specifically, the differential gear set 21 functions as a medium transmitting torque received by the case 27 to the side gears 23 and 25, allowing differential motion therebetween. Although FIG. 3 illustrates a bevel gear type, of course a face gear type, a planetary gear type or any other suitable gear type may be used.

In the illustrated example, a clutch member 11 that can transmit torque from the case 27 is axially movable. The side gear 23 is provided with clutch teeth for example, which enables coupling with the clutch member 11, whereby the combination of the clutch member 11 and the clutch teeth constitute a clutch 10. When the actuator 1 drives the clutch member 11 to connect the clutch 10, the side gear 23 is temporarily engaged with the case 27 to transmit the torque. Then the other side gear 25 becomes less able to make differential motion relative to the side gear 23, and thus the differential 3 comes into a so-called differential-lock state where it loses its differential function. When the actuator 1 disconnects the clutch 10, the differential 3 differentially distributes the torque received by the case 27 to both the axles 43.

Figure 4:
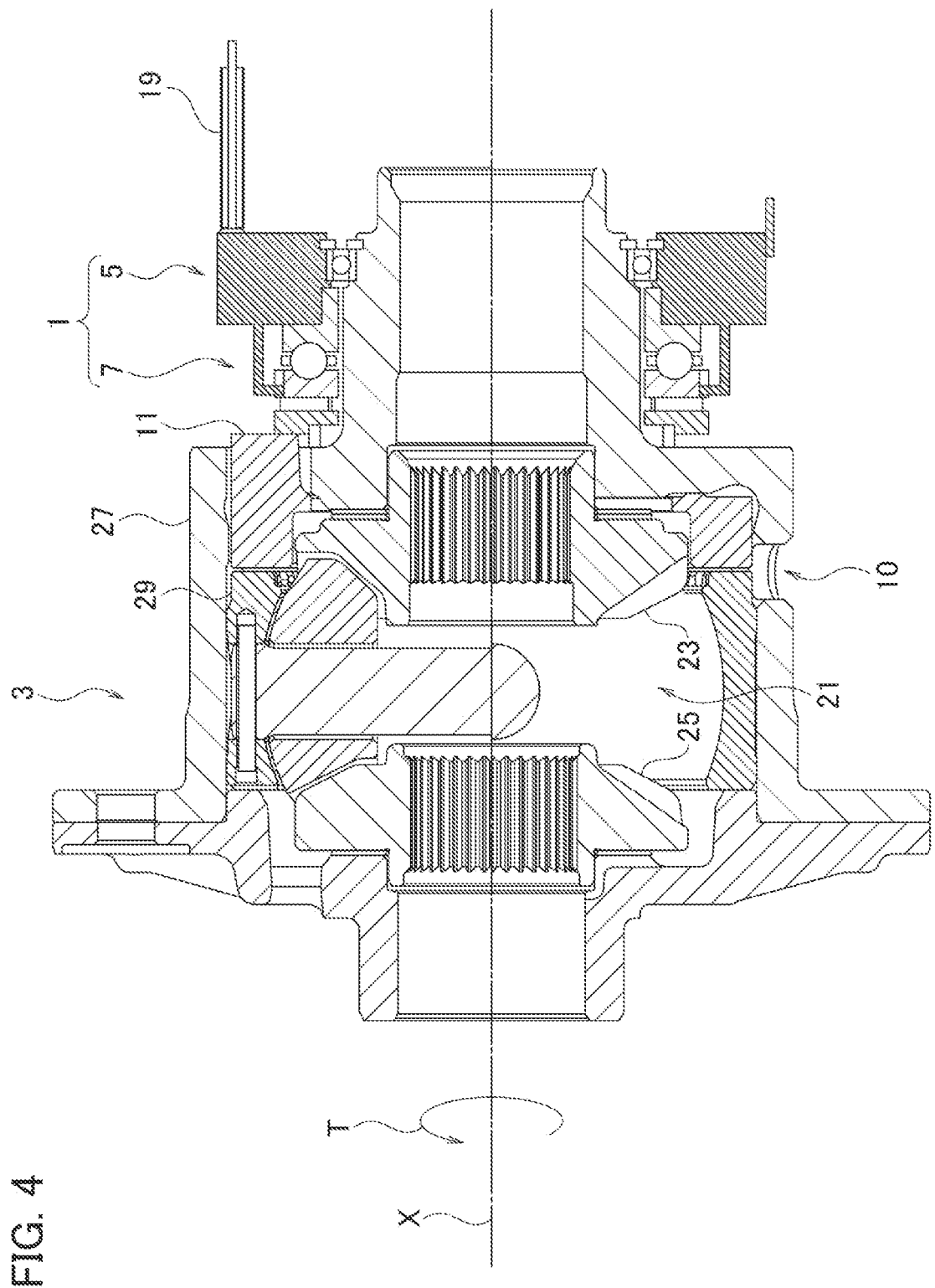
FIG. 4 is a sectional elevational view of a combination of the system of FIG. 1 and a free-running differential.
Figure 5:
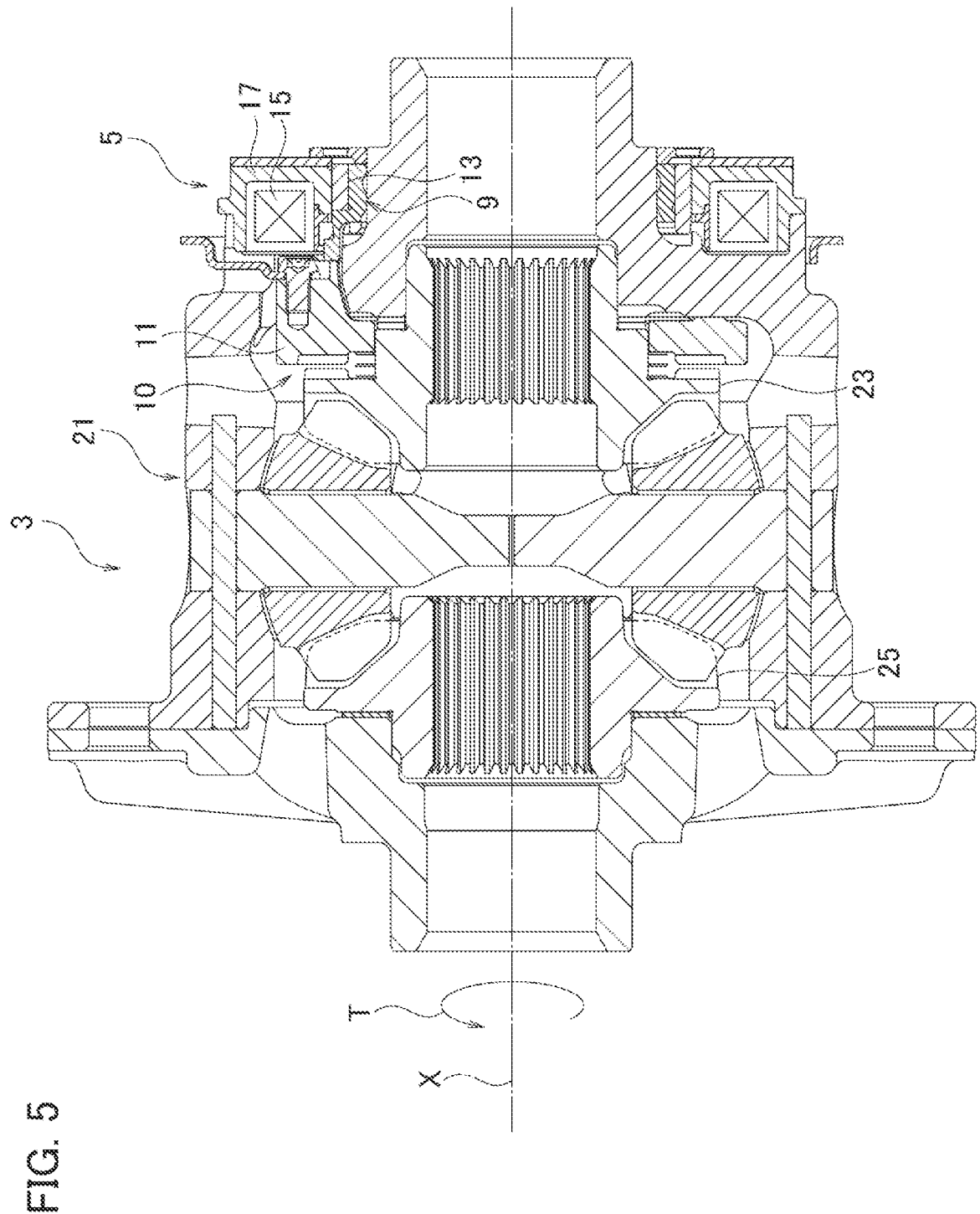
FIG. 5 is a sectional elevational view of a combination of the system of FIG. 1 and a lock-up differential according to another example.

Alternatively, referring to FIG. 4, the case of the differential 3 can be divided into an outer case 27 for receiving torque and an inner case 29 coaxial therewith and rotatable relative thereto. In this example, the differential gear set 21 is coupled with the inner case 29 and one end, for example, of the inner case 29 is provided with dog teeth to constitute the clutch 10. When the actuator 1 connects the clutch 10, the torque is transmitted through the outer case 27 to the inner case 29, and further differentially distributed via the differential gear set 21 to both the axles. When the actuator 1 disconnects the clutch 10, the differential gear set 21 does not receive the torque from the outer case 27 and therefore both the axles 43 are freed from the power system.

In common among the examples shown in FIG. 2 through FIG. 4, the actuator 1 is provided with a hollow shaft motor 5 that causes a movable element 13 to make a rotational motion R about the axis X, and a conversion mechanism 7 to convert the rotational motion R into an axial linear motion. The conversion mechanism 7 is provided with a thrust member 9 having a cam face 9c, and can output the rotational motion R as a linear motion of the thrust member 9 in a direction along the axis X. The thrust member 9 is in contact with or coupled or engaged with the clutch member 11, which at least at its rearmost position disconnects the clutch 10 and at least at its foremost position connects the clutch 10.

Or, as in the example shown in FIG. 5, the actuator 1 may be so configured as to directly cause the movable element 13 to make a linear motion. For example, if a core 17 encloses a solenoid 15 but keeps a gap at the side opposed to the movable element 13, the magnetic flux bypasses the gap and there flows to the movable element 13, thereby driving the movable element 13. Of course, as long as it can drive the movable element 13 linearly, any other suitable structure could be used. In this case, while the thrust member 9 may be directly coupled with, or engaged with, the movable element 13, any mechanism may be interposed between the thrust member 9 and the movable element 13. As with those described above, the clutch 10 becomes connected/disconnected according to the forward/rearward motion of the thrust member 9.

In the examples described above, the system is used in combination with the differential for distributing torque to the rear axles 43 but may be of course used in combination with a differential for distributing torque to the front axles 41. Alternatively, the system is not necessarily limited to the differential but can be used in combination with various rotary machines involving dog clutches as described above, examples of which are a transmission 33, a transfer 35, a coupling device, or the like. In addition, the dog clutch may be a so-called dog clutch provided with dog teeth for example, but any other type such as a claw clutch, or more generally, a clutch using not friction but any meshing structure to transmit torque may be used in general.

In either example, the actuator 1 is configured so that the position of the movable element 13 corresponds to connection/disconnection of the clutch 10. The actuator 1 is in general provided with the solenoid 15 generating magnetic flux, the core or stator 17 for guiding the magnetic flux, and the movable element 13 that is urged by the magnetic flux to make a rotational or linear motion. The movable element 13 is arranged to receive the magnetic flux, and is drivingly coupled with and thereby drives the thrust member 9. In the examples shown in FIGS. 2 through 5, the solenoid 15 is generally immovable along with the stator 17 and only the movable element 13 is made movable, whereas instead only the core or stator 17 may be immovable and the solenoid 15 along with the movable element 13 may be movable.

Referring again to FIG. 1, the solenoid 15 is electrically connected via a cable 19 to an external electric circuit 51. Or, the electric circuit 51 may be partially or totally contained in the actuator 1. The vehicle is normally provided with a plurality of programmable electronic control units (ECUs) for electronically controlling various parts of the vehicle. Each ECU is provided with a memory device for storing commands and data and a microcontroller that can read out and execute the commands. The plurality of ECUs perform communication or share information through a so-called controlled area network (CAN) for example.

One ECU 55 among them is electrically connected to the electric circuit 51 to control its operation. The electric circuit 51 is further connected to a power source 53 and, under control by the ECU 55, applies and cuts off electric power to the solenoid 15. The electric power applied to the solenoid 15 may be in a form of direct current, alternating current, pulsate current or pulses in accordance with the drive principle of the actuator 1.

The electric circuit 51 is provided with an oscillator to generate alternating-current power of a particular frequency and adds it to the electric power for driving the actuator 1. The added electric power may be made sufficiently smaller than the electric power for driving so as not to affect actions of the movable element 13. Further the frequency may be suitably selected so as not to affect actions of the movable element 13 and in light of the convenience of separation from the electric power for driving.

Figure 6:
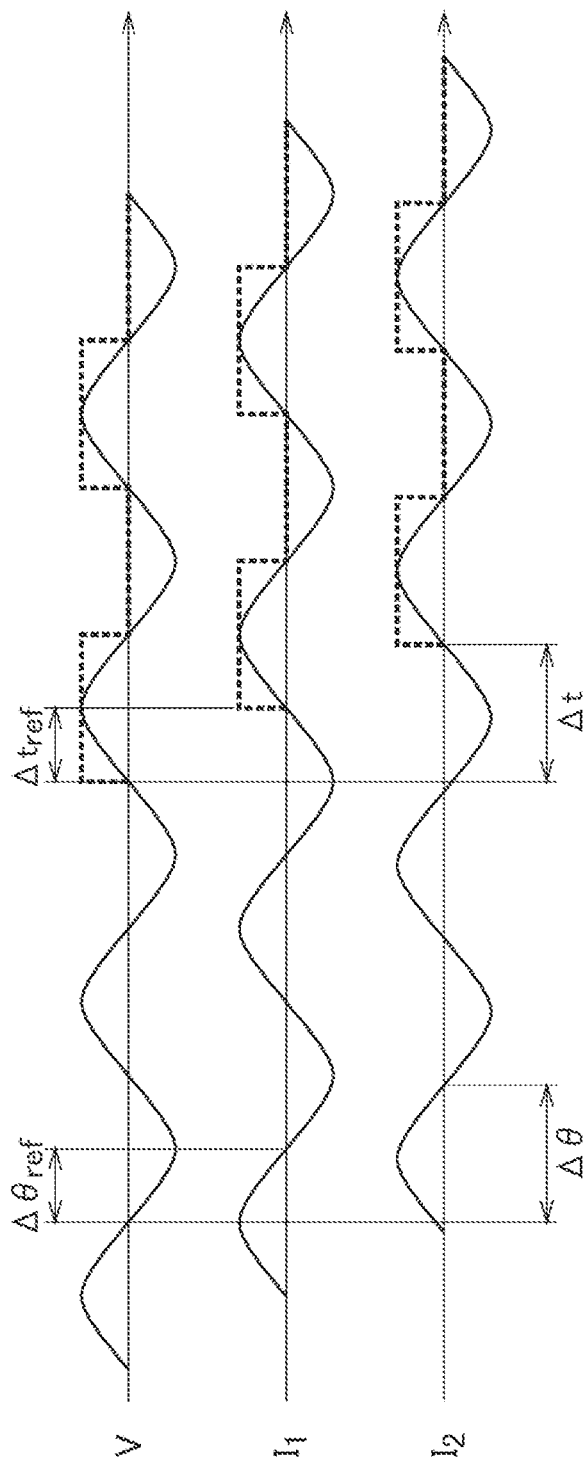
FIG. 6 is a schematic drawing of waveforms in explanation of phase differences of currents relative to a voltage, which shows influence of a position of a movable element on a phase difference.

Referring to FIG. 6, as the solenoid 15 has a natural inductance, in the added alternating-current electric power, the inductance can produce a phase difference $\Delta\theta_{ref}$ of the electric current $I_1$ relative to the electric voltage V. When the movable element 13 moves relative to the core or stator 17 from a first position to a second position, the inductance of the solenoid 15 changes in accordance with the change in position and consequently the phase difference $\Delta\theta$ of the electric current $I_2$ relative to the electric voltage V can also change. On the other hand, if a suitable bandpass filter (or, a high-pass filter or a low-pass filter according to circumstances) is provided, the added alternating-current electric power can be readily separated from the electric power for driving, and further it is readily usable to detect the phase difference $\Delta\theta$. The position of the movable element 13 can be determined by detecting the change in the phase difference $\Delta\theta$. In a case where the clutch 10 becomes disconnected when the movable element 13 is at the first position and the clutch 10 becomes connected when the movable element 13 is at the second position, for example, by determining at which the movable element 13 is on the basis of the change in the phase difference $\Delta\theta$, it can be determined whether the clutch 10 is disconnected or connected.

In the present embodiment, the inductance changes only by location change of the movable element 13, but instead, or in addition, the device may be so modified that any other member by its movement causes inductance change. If one magnetic member moving in conjunction with the movable element 13 gets close to or moves away from another magnetic member for example, it may cause change in inductance. Further, while in the present embodiment the inductance change of the solenoid 15 is used for the determination, an electromagnetic coil independent of the solenoid 15 may be used instead. As long as any location change of the thrust member 9, the clutch member 11 or any movable member coupled with any of them causes inductance change, it could be used for the determination. Or, capacitance change may be used in place of inductance change.

Figure 7:
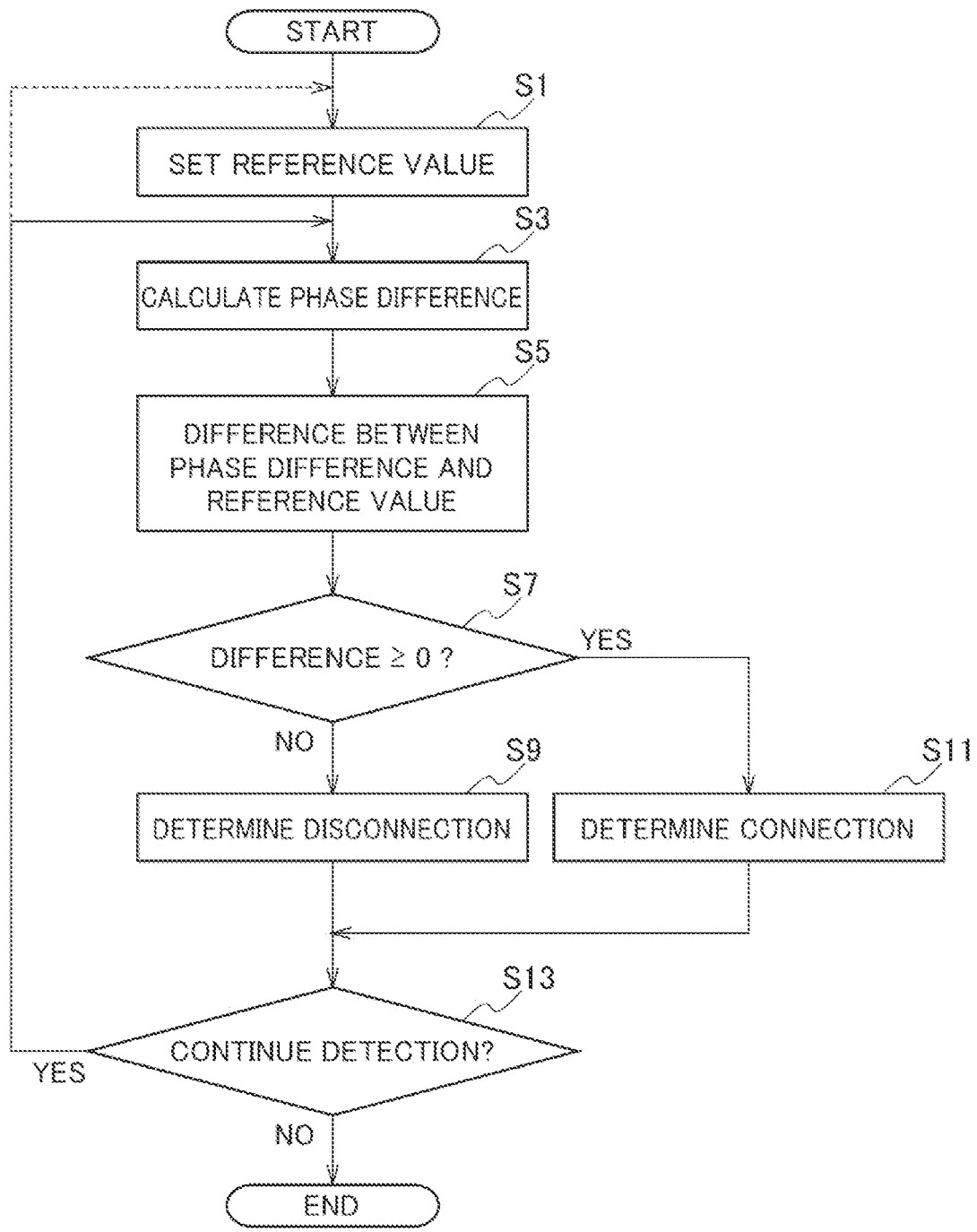
FIG. 7 is a flowchart in explanation of a process in which a controller determines a position of a thrust member according to an example.

The ECU 55, for example, according to an algorithm exemplarily shown in FIG. 7, determines whether the clutch 10 is disconnected or connected.

The ECU 55 sets an appropriate reference value for the determination (Step S1). The ECU 55 next detects phases of a voltage and a current and calculates a phase difference (Step S3). The ECU 55 further calculates a difference between the phase difference and the reference value (Step S5) and then determines whether the calculated difference is less than zero or not (Step S7). In a case where the difference is less than zero, for example (specifically, the phase difference is less than the reference value), it determines that the clutch is disconnected (Step S9), whereas in a case where it is not less than zero (specifically, the phase difference is equal to or larger than the reference value), it determines that the clutch is connected (Step S11). Alternatively, the algorithm may be modified so that it determines "connected" in a case of less than zero and determines "disconnected" in a case of not less than zero.

The ECU 55, on the basis of any request from another ECU for example, determines whether the detection should be continued or not (Step S13). In a case where it should be continued, the ECU 55 goes back to the step for detecting the phases (Step S3). Or, the reference value may be set again (Step S1) because the inductance may change according to change in temperature or such parameters of the actuator 1. Changes of the reference value over time may be stored in advance in the memory, or compensating values linked with any parameters such as temperatures may be stored as a table in the memory and an optimal reference value may be calculated therefrom and set in each case. In any case, as these cycles are repeated, whether the clutch 10 is connected or disconnected can be continuously determined.

Although the aforementioned determination could be made by an ECU running a program in line with the aforementioned algorithm, partly or totally applicable are any application-specific integrated circuits so designed as to perform operations equivalent to those performed by the aforementioned algorithm. In the latter case, the ECU 55 may be so configured as to perform communication with the integrated circuits through a CAN network or a dedicated bus to receive calculated values and/or determination results.

Figure 8:
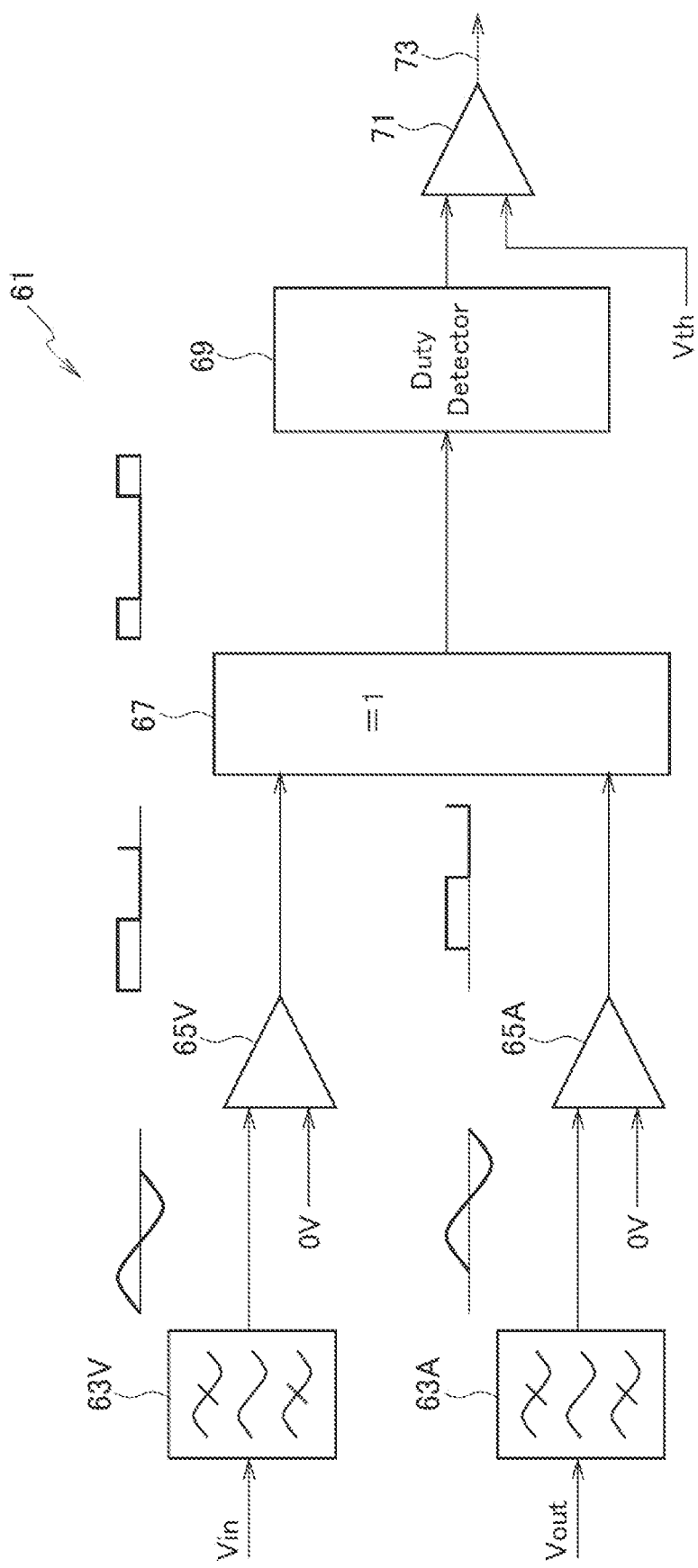
FIG. 8 is a block diagram of an electric circuit that converts a phase difference into an electric potential according to an example.

Comparison between the phase difference and the reference value can be executed by using a circuit shown as a block diagram in FIG. 8, for example. The drawing shows an example in which a current in the electric power applied to the solenoid is converted into a potential $V_{out}$ and a phase of this is compared with a phase of an input voltage $V_{in}$ applied to the solenoid. Of course, in reverse, the input voltage may be converted into a current and phases of the currents may be compared. The potential $V_{out}$ and the voltage $V_{in}$ are, after respectively being made to pass through bandpass filters (or, high-pass filters or low-pass filters, as described above) 63V and 63A, compared with zero volt respectively by comparators 65V and 65A to be converted into pulses. As is to be understood with reference to broken lines in FIG. 6, the time difference $\Delta t$ is equivalent to the phase difference $\Delta\theta$.

Referring back to FIG. 8, the pulses taken out by the comparators 65V and 65A are input into an exclusive OR (XOR) gate 67. Its output, as being an exclusive OR between the pulses, has a duty cycle ratio in proportion to the phase difference and, when being input to a duty cycle detector 69, resultantly gives a potential in proportion to the phase difference. The potential can be directly read out, quantified, and then output to the ECU 55. Or, the output potential may be further input into a comparator 71 to be compared with a reference potential $V_{th}$ and the resultant output may be output to the ECU 55. When the reference potential $V_{th}$ according to the reference value is input, the output by the comparator 71 can be used as a determination value (YES: 1, NO: 0) in the step S7 in FIG. 7.

The description above is an example and any phase detector or any phase comparator that generates a voltage signal representing a phase difference between two signal inputs could be used.

According to any of the aforementioned embodiments, states of a clutch can be determined from the exterior only by addition of small alternating-current electric power on electric power for driving a clutch, without any additional structure. The added electric power is sufficiently small as compared with the driving electric power and does not, as being an alternating-current power, generate any driving force in average. Further, as a sufficiently high frequency that the thrust member cannot follow is applicable to the alternating current, the added electric power does not drive the thrust member and affect action of the clutch. Further, as the system is sufficiently power saving, it does not lead to reduction in energy efficiency and overheating of related components. The determination can be continuously executed so long as the supply of electric power is maintained, and can be used not only for an operation check on the clutch but also for finding malfunction or failure. Of course the determination can be limited in a necessary period and then improvement of energy efficiency can be further pursued.

Although certain exemplary embodiments are described above, modifications and variations of the embodiments will occur to those skilled in the art, in light of the above teachings.

What is claimed is:

1. A system for controlling a clutch, comprising:
 a thrust member drivingly coupled with the clutch and movable axially between a first position for disconnecting the clutch and a second position for connecting the clutch;
 a solenoid generating a magnetic flux in response to input of electric power;
 a movable element arranged to receive the magnetic flux and drivingly coupled with the thrust member, the movable element being set into motion by the magnetic flux to drive the thrust member between the first position and the second position;
 an electric circuit configured to add alternating-current power to the electric power and apply the electric power with the alternating-current power to the solenoid; and
 a controller electrically connected to the electric circuit and configured to detect a phase difference of an electric current relative to an electric voltage in the alternating-current power added to the electric power and compare the detected phase difference with a reference value to determine whether the thrust member is at the first position or at the second position.

2. The system of claim 1, wherein the electric circuit includes a comparator configured to convert the electric current and the electric voltage respectively into pulses, and a detector configured to generate an electric potential corresponding to a time difference between the pulses.

3. The system of claim 2, wherein the controller is configured to use the electric potential generated by the detector to compare the phase difference with the reference value to determine whether the thrust member is at the first position or at the second position.

4. The system of claim 1, further comprising:
 a conversion mechanism configured to convert a rotational motion into an axially linear motion, the conversion mechanism being interposed between the movable element and the thrust member to transmit the linear motion to the clutch member;
 wherein the movable element is arranged to share an axis with the clutch, coupled with the conversion mechanism, and set by the magnetic flux into the rotational motion about the axis.

* * * * *